United States Patent
Tatourian et al.

(10) Patent No.: US 9,858,478 B2
(45) Date of Patent: Jan. 2, 2018

(54) BI-DIRECTIONAL COMMUNITY INFORMATION BROKERAGE

(71) Applicant: Intel Corporation, Santa Clara, CA (US)

(72) Inventors: Igor Tatourian, Fountain Hills, AZ (US); Hong Li, El Dorado Hills, CA (US); Rita H Wouhaybi, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 14/577,965

(22) Filed: Dec. 19, 2014

(65) Prior Publication Data

US 2016/0180144 A1    Jun. 23, 2016

(51) Int. Cl.
| | | |
|---|---|---|
| G06K 9/00 | (2006.01) |
| G06F 17/30 | (2006.01) |
| G06T 3/00 | (2006.01) |
| G01C 21/34 | (2006.01) |
| G01C 21/00 | (2006.01) |
| G06T 7/33 | (2017.01) |

(52) U.S. Cl.
CPC .......... *G06K 9/0063* (2013.01); *G01C 21/00* (2013.01); *G01C 21/3415* (2013.01); *G06F 17/3087* (2013.01); *G06F 17/30241* (2013.01); *G06K 9/00651* (2013.01); *G06T 3/0068* (2013.01); *G06T 7/337* (2017.01); *G06T 2207/30232* (2013.01); *G06T 2207/30252* (2013.01); *G06T 2210/61* (2013.01)

(58) Field of Classification Search
None
See application file for complete search history.

(56) References Cited

U.S. PATENT DOCUMENTS 8,744,126 B1 * 6/2014 Rohrschneider ..... G06K 9/0063
                                                    382/100
9,175,966 B2 * 11/2015 Martin ................. G07C 5/0866
(Continued)

FOREIGN PATENT DOCUMENTS

| WO | WO-2014080388 A2 | 5/2014 |
| WO | WO-2016100192 A1 | 6/2016 |

OTHER PUBLICATIONS

"International Application Serial No. PCT/US2015/065518, International Search Report dated Mar. 30, 2016", 3 pgs.
(Continued)

*Primary Examiner* — Matthew Bella
*Assistant Examiner* — Soo Shin
(74) *Attorney, Agent, or Firm* — Schwegman Lundberg & Woessner, P.A.

(57) ABSTRACT

A system for transmitting notifications based on image data analysis may comprise: an image registration module to receive, from an unmanned aerial vehicle, current image data of a geographic location; a change detection module to: compare the current image data with previous image data of the geographic location to identify a change in the geographic location; and analyze the change to determine a category of the change in the geographic location; and an action module to: determine at least one party to notify about the change based on the category; and transmit a notification to the at least one party via an unmanned aerial vehicle.

25 Claims, 6 Drawing Sheets

(56) References Cited

U.S. PATENT DOCUMENTS

| | | | |
|---|---|---|---|
| 2005/0271300 A1* | 12/2005 | Pina | G06K 9/4647 |
| | | | 382/294 |
| 2012/0258737 A1 | 10/2012 | Bennett, Jr. | |
| 2012/0299751 A1 | 11/2012 | Verna et al. | |
| 2013/0325325 A1* | 12/2013 | Djugash | G01C 21/3415 |
| | | | 701/425 |
| 2014/0172194 A1* | 6/2014 | Levien | G08G 5/0091 |
| | | | 701/2 |
| 2014/0303884 A1* | 10/2014 | Levien | G08G 5/04 |
| | | | 701/301 |
| 2014/0316614 A1 | 10/2014 | Newman | |
| 2015/0094883 A1* | 4/2015 | Peeters | B64C 19/00 |
| | | | 701/3 |
| 2015/0166072 A1* | 6/2015 | Powers | B60W 40/06 |
| | | | 701/1 |
| 2016/0059962 A1* | 3/2016 | Abuelsaad | G08G 1/096716 |
| | | | 701/3 |
| 2016/0093212 A1* | 3/2016 | Barfield, Jr. | H04N 7/185 |
| | | | 348/144 |
| 2016/0217577 A1* | 7/2016 | Tom | G06T 7/0026 |
| 2016/0217582 A1* | 7/2016 | Sasaki | G06K 9/2081 |

OTHER PUBLICATIONS

"International Application Serial No. PCT/US2015/065518, Written Opinion dated Mar. 30, 2016", 7 pgs.

* cited by examiner

BI-DIRECTIONAL COMMUNITY INFORMATION BROKERAGE

TECHNICAL FIELD

Embodiments described herein generally relate to information exchange systems and in particular, but not by way of limitation to bi-directional community information brokerage.

BACKGROUND

Drones, such as unmanned aerial vehicles (UAVs), are no longer restricted to being operated by military or government personnel. Increasingly, the drones are being operated by commercial companies as well as individuals. For example, drones may be used to check on oil pipelines, for precision agricultural mapping, and to determine status of construction. During such operations, the drones may take pictures and video and store the data or transmit the data back to the drone operator. Such uses of UAVs are often non-collaborative. Thus, information from one drone is not used by another even if such information could be useful.

In other instances, social networks may be used to share information, but the information is often limited and narrow in scope. For example, a social network may be used to share traffic data between users. However, this information is not available outside of the social network and is often restricted to running specific applications on specific devices.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

The prevalence of drones (autonomous or otherwise) with information gathering sensors, such as cameras, creates a wealth of information to be gathered and analyzed. The information may be analyzed over a period of time as short as a few minutes or as long as years to determine changes in the environment. For example, images of a farm taken from a drone on one day may be compared with images taken from a drone two weeks prior. In various examples described herein, an information brokerage ecosystem is described that allows relevant changes in the environment be communicated to one or more parties based on the context of the change. Other benefits of the systems and methods are also described in this disclosure.

Figure 1:
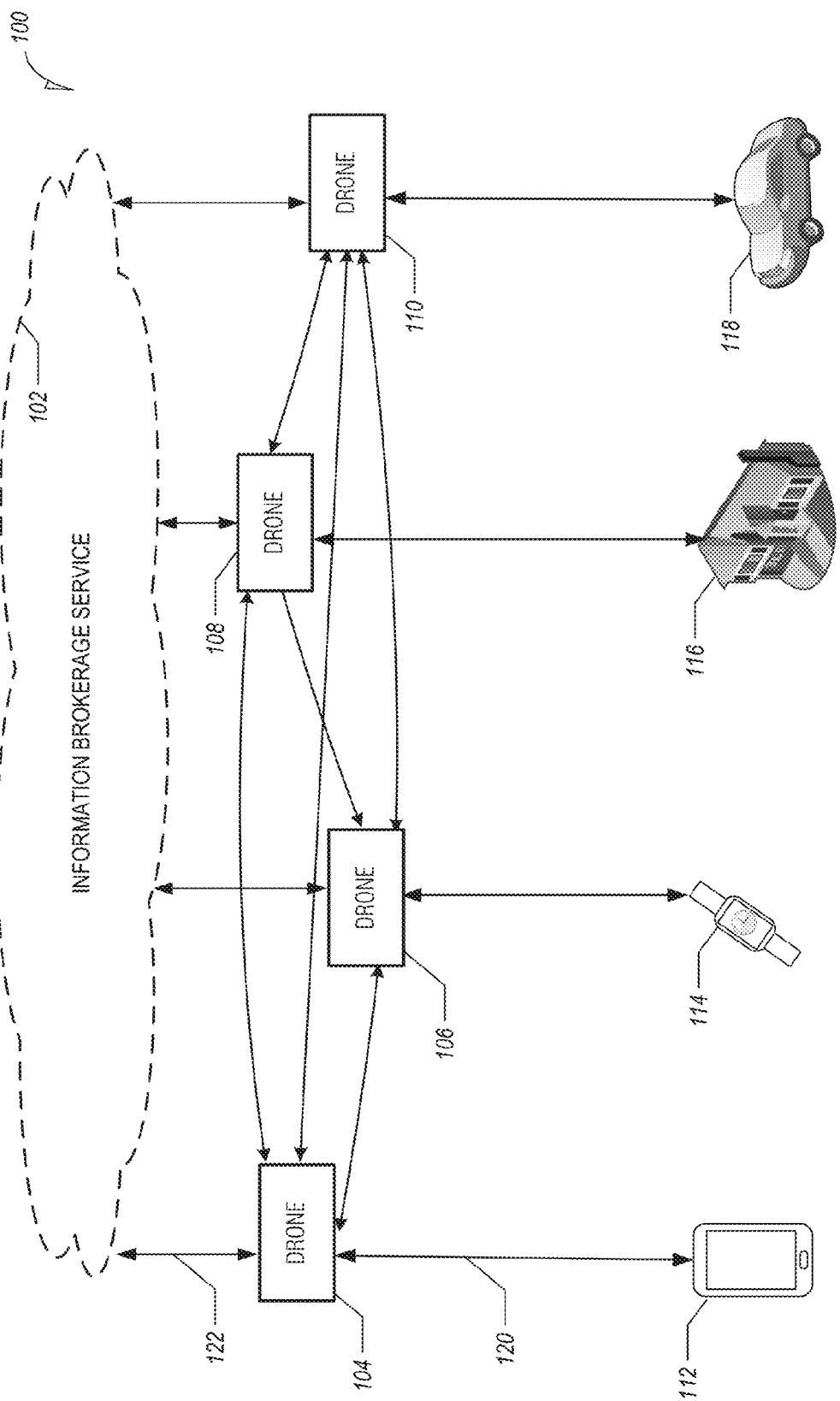
FIG. 1 is a system diagram illustrating an overview of an information brokerage ecosystem, according various examples.

FIG. 1 is a system diagram illustrating an overview of an information brokerage ecosystem 100, according various examples. The information brokerage ecosystem 100 includes an information brokerage service 102, UAVs 104-110, a smart phone 112, a wearable device 114, a property 116, a vehicle 118, and communication lines 120 and 122. This disclosure discusses using four UAVs (UAVs 104-110); however, many more UAVs may be used in the manner described herein. Similarly, the information brokerage ecosystem 100 may operate with fewer UAVs. Further, while the information brokerage ecosystem 100 is illustrated with a few example devices—the smart phone 112, the wearable device 114, sensors on the property 116, and the vehicle 118—communicating with the UAVs 104-110, more devices may be used as described herein.

In various examples, the components illustrated in the information brokerage ecosystem 100 may communicate via one or more networks (e.g., over communication lines such as the communication lines 120 and 122). A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network may include a single local area network (LAN) or wide-area network (WAN), or combinations of LAN's or WAN's, such as the Internet. In various examples, communication may be one-way. For example, sensors on the property 116 or the vehicle 118 may broadcast information, but they may be incapable of receiving data.

In various examples, the UAVs 104-110 collect data from a variety of sources—such as from onboard sensors. For example, the UAVs 104-110 may take pictures of the ground below as they fly over an area. The pictures may be geocoded with the coordinates of where the picture was taken, and the pictures may be time-stamped. In various examples, the pictures are taken using electro-optical sensors or infrared sensors. The UAVs 104-110 may collect sensor data from onboard or ground-based devices (e.g., sensors on the property 116) including, but not limited to, temperature sensors, pressure sensors, depth cameras, gyroscopes, accelerometers, and magnetometers. Sensor data from these devices may be time-stamped and geocoded.

The UAVs 104-110 may be operated autonomously, semi-autonomously, or manually. For example, an autonomous UAV may be programmed with a path using waypoints (e.g., latitude, longitude, elevation) that the UAV follows and the returns back to its origination point. A semi-autonomous UAV may be programmed to navigate to a specific spot and then wait for further instructions.

In various examples, the UAVs 104-110 continually fly over an area to build-up image data of the area over time. For example, the UAV 104 may fly over an area on a first day and the UAV 106 may fly over the area a second day. The same UAV may also be used to take pictures of the same area. The time between flights over an area may be determined based on the type of area. For example, if the area being observed is a highway during rush hour, the UAVs 104-110 may take pictures every five minutes. Whereas, if the area is a rural area, the pictures may be taken once a week.

In various examples, a UAV provides a live feed of the camera to a requesting or interested party. For example, if an environmental event—such as a mudslide—is detected by the UAV, a live feed of the mudslide may be broadcast to local authorities.

Figure 2:
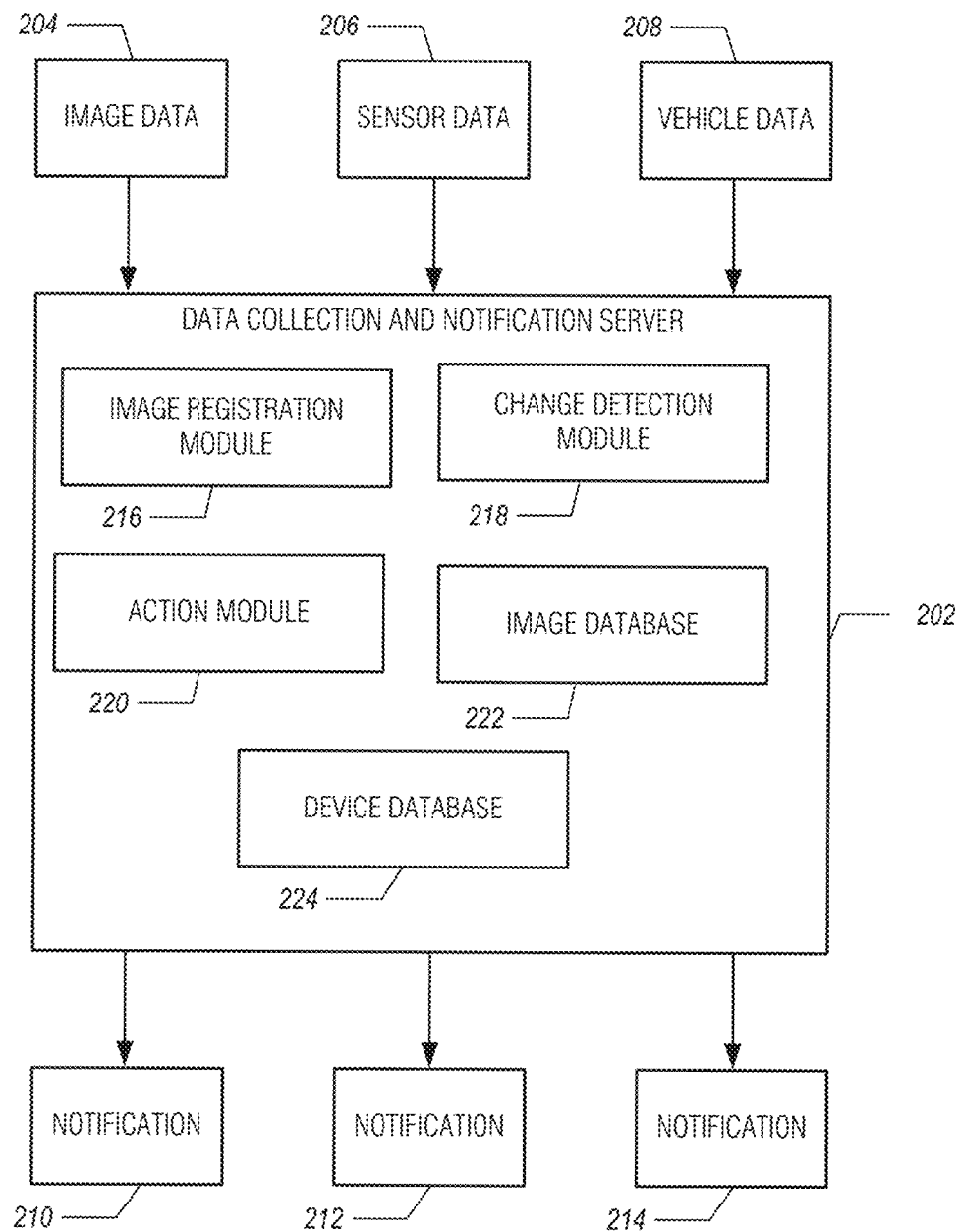
FIG. 2 illustrates components of a data collection and notification server, according to various examples.

In various examples, the smart phone 112 and wearable device 114 may receive notifications from the UAVs 104-110 about changes in the environment as described further with respect to FIG. 2. Furthermore, the smart phone 112 and wearable device 114 may communicate readings from sensors of the smart phone 112 and wearable device 114 to the UAVs 104-110.

In various examples, the property 116 includes sensors, such as cameras (e.g., infrared, visual, and depth), noise, temperature, and chemical sensors. The sensors may be network-enabled to communicate with one or more UAVs 104-110. While illustrated as a house, the property 116 may take any form such as a farm, commercial building, or empty piece of land. In various examples, the sensors are located on property owned by the government.

In various examples, the vehicle 118 may broadcast to or communicate with the UAVs 104-110. For example, the vehicle 118 may broadcast vehicle data including operating conditions of the vehicle. The conditions may include the currents speed of the vehicle, whether or not a turn signal is on, temperature of the vehicle, etc. The vehicle 118 may also transmit other vehicle data including navigation information that includes a route the vehicle is taking. For example, a user may program a destination using a GPS navigation system. The route may include the streets/turns the vehicle will take and the approximate times the vehicle will reach each street/turn.

In various examples, the smartphone 112, wearable device 114, property 116, and vehicle 118 may transmit information they collected with embedded hardware/software sensors back to the information brokerage service 102, via UAV's. Examples of embedded hardware sensors on these consumer/IoT devices include, but are not limited to, GPS, cameras, motion detectors, speedometers, thermometers, etc. Software sensors may include social networking applications, device-to-device communications, and other online information sources. Such sensor information may be received by the information brokerage service 102 as feedback to further improve the richness and accuracy of future information provisioning and change detection.

FIG. 2 illustrates components of a data collection and notification server 202 (referred to herein as the notification server 202). The notification server 202 receives multiple types of data including, but not limited to, image data 204, sensor data 206, and vehicle data 208, and the notification server 202 outputs notifications 210-214. In an example, the notification server 202 includes an image registration module 216, a change detection module 218, an action module 220, an image database 222, and a device database 224.

While the modules and databases of FIG. 2 are illustrated as existing separately, two or more of the modules or databases may be merged. For example, the image database 222 and the device database 224 may exist as a single database. Similarly, the labels of the modules and database are for illustration purposes and other labels may be used without departing from the scope of this disclosure.

Additionally, the modules and databases may operate on one or more servers. Thus, although the functionality of the notification server 202 is described with reference to a single server, multiple servers may be used to process data. Similarly, the components may be duplicated across multiple servers to handle additional data and notifications.

The databases may be configured in a number of ways. For example, the databases may be flat file databases, relational databases, non-relational databases, or combinations thereof. In various examples, a file structure is used to store data in the databases. For example, image files may be stored on a disk and entries in the databases may include the path to the actual image files.

In various examples, the image database 222 stores image data on one or more geographic locations. Image data may include images files (e.g., JPEG, TIFF, PNG, BMP, etc.) or video files (H.264, H.265, VP8, AVC, etc.) of a geographic location. Different geographic locations may vary in size. For example, one location may be two-square miles whereas another may be 100 meters by 50 meters. The metes and bounds of a geographic location may be represented as a series of longitude and latitude coordinates in an entry of the image database 222. A series of geographic locations may be represented together to form a comprehensive map of the areas monitored by the UAVs 104-110.

In various examples, the image data 204 is captured by the UAVs 104-110 and transmitted to the notification server 202. The UAVs 104-110 may transmit data as it is captured or transmitted in batches. For example, if a UAV is monitoring traffic the UAV may transmit the image data in real-time. Conversely, if the UAV is in a rural area the UAV may transmit all the image data of a flight at once (e.g., at the end of the flight). In an example, the UAV does not transmit a full image, but only the changes in the image from the last time an image was captured.

In various examples, the sensor data 206 and the vehicle data 208 may be transmitted to the notification server 202 via the UAVs 104-110. For example, the sensor data 206 may include sensor readings from sensors within range of a UAV or onboard the UAV as described above with reference to FIG. 1. Similarly, the vehicle data 208 may be from vehicles within communication range of a UAV.

In various examples, a geographic location is associated with one or more users. A user may be a party who owns the land or otherwise has interest in changes to the land. For example, a user may be a homeowner or a local authority. Thus, as discussed further below with respect to the action module 220, if the sensor data 206 indicates water is present in a home, the owner of the home may be notified.

In various the image data 204 is processed by the image registration module 216. Processing may include matching received image data with existing image data in the image database 222. Various image registration algorithms may be used, which include but are not limited to intensity-based and feature-bases algorithms. Image registration may include manipulations such as scaling, rotating, and changing brightness levels of the image data to match existing image data for a geographic region.

To facilitate image registration, the image registration module 216 may initially locate image data in the image database 222 that has geo-coordinates in proximity to geo-coordinates of the received image data. Upon matching the image data, the image data 204 (manipulated if necessary) may be stored in the image database 222 with an associated time-stamp. Thus, there may be multiple entries for a given geographic location—one for each time image data was taken for a geographic region.

In various examples, the received sensor data 206 (e.g., data from the wearable device 114, the property 116, and other network-enabled devices) and the received vehicle data 208 may be stored in the device database 224. For example, the device database 224 may have entries for the sensors and vehicles that have communicated data to the UAVs 104-110. The various sensors and vehicles may be identified by unique identifiers in the device database 224. As with the image data, multiple entries may be made over time for each sensor/vehicle to create a comprehensive history of the sensors/vehicles. The entries may also include associated users (e.g., owners) for the sensors and vehicles.

In various examples, the change detection module 218 analyzes data in the image database 222 to determine how a geographic region has changed over time. For example, many things may cause a geographic region to change. These changes may categorized in a number of ways, including but not limited to, environmental changes, infrastructure change, and traffic hazards. In some instances a change may have multiple categories. Environmental changes may include changes due to weather such as mudslides, landslides, tornadoes, floods, avalanches, droughts, etc. Infrastructure changes may include changes in manmade structures such as bridge deterioration, house fires, collapsed buildings, etc. Traffic hazards may be from changes on navigable roads due to traffic patterns changes (e.g., heavy traffic), road blockages (e.g., debris on a road), or wildlife being present on a road. Other categories may also be used without departing from the scope of this disclosure.

Figure 3:
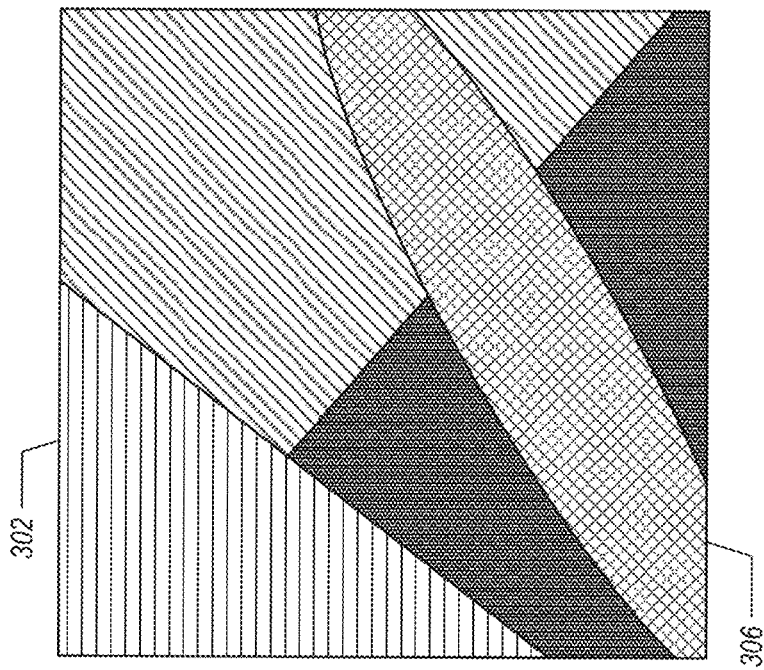
FIG. 3 illustrates image data of an environmental change, according to various examples.
Figure 3:
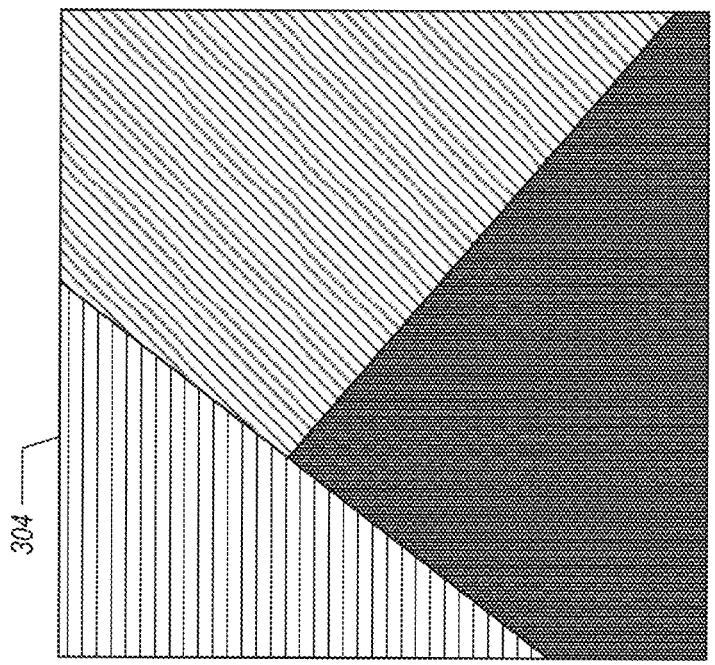

FIG. 3 illustrates image data of an environmental change, according to various examples. FIG. 3 includes current image data 302 and previous image data 304 of a farm—crops of the farm are represented by various patterns for illustration purposes. As illustrated, there are a variety of crops in both the current image data 302 and the previous image data 304. However, also present in the current image data 302 is an environmental change 306. In this example, the environmental change 306 may be caused by a tornado.

In various examples, to detect the environmental change 306, the change detection module 218 may utilize various computer vision techniques to detect that the image data of the farm has changed by a certain amount (e.g., 20%) and attempt to categorize the change using pattern matching. For example, the change detection module 218 may match the environmental change 306 with previously categorized changes and determine the change is from a tornado or from locusts. Other types of environmental change may be determined in a similar fashion. For example, if the current image data includes a substantial amount of blue colored pixels not previously present, the change detection module 218 may determine there was/is a flood in the area.

In various examples, the change detection module 218 may utilize multiple images taken over time to determine if a change has occurred. For example, if a geographic location has a certain percent change (e.g., a portion of an image is different by a threshold amount) every seven days, the change detection module 218 may ignore the change as environmental change because it is a repeated manmade phenomenon. Further, the change detection module 218 may utilize the feedback information received from multiple sources including the smartphone 112, wearable device 114, property 116, and vehicle 118 as illustrated in FIG. 1 to improve the accuracy of correlation.

In various examples, to detect an infrastructure change, the change detection module 218 may utilize infrared or thermal imagery of a structure, ultrasound, or other techniques that allow the creation of a representative state of a structure or environment. The images themselves may be processed to extract features to help future differential analysis. For example, a comparison of infrared images may detect cracks in bridges or buildings. Similarly, infrared imagery of a house may easily detect an increase in heat that may signify a house fire or if a drop in temperature is noted, that a furnace may not be functioning. In various examples, the change detection module 218 may access infrastructure locations from a database (not shown) to facilitate comparisons. For example, bridges and roads may be geocoded the change detection module 218 may analysis portions of image data from the image database 222 that are at those locations. In an example, the change detection module 218 utilizes computer vision techniques to determine the presence of infrastructure elements. In various examples, a baseline of a geological location may be based on data captured from sources other than a UAV. For example, geological survey data may be normalized and compared to image data received from a UAV.

In various examples, the change detection module 218 may detect traffic hazards in a variety of ways. For example, a UAV may detect a traffic hazard by comparing image data over time of a road. The comparison may remove the vehicles from the road (e.g., using pattern matching computer vision techniques) and determine if there are object(s) on the road. In an example, the change detection module 218 may not remove the vehicles and determine that traffic has slowed on a given road. In an example, the change detection module 218 may analyze the image data and determine the presence of wildlife (e.g., a deer) near the road—categorizing it as a traffic hazard.

In various examples, the action module 220 determines what action to take based on the results of the change detection module 218. For example, different categories of changes may have different notifications and be transmitted to different people. In an example, notification preferences may be stored on the notification server 202. The notification preferences may indicate who should get notified for what change.

In various examples, users may log in to the notification server 202 to set, modify, or delete a notification preference. For example, a property owner may utilize an application on a computing device (e.g., tablet, personal computer, mobile phone) or a web-browser to access a user interface provided by the notification server 202. Using input mechanisms as known in the art (e.g., input boxes, drop-down menus, check boxes, etc.), a property owner may select the conditions and notifications for a property. A user may also set a notification preference for when to receive a notification for a sensor. For example, if a sensor reading goes above or below a certain threshold.

For example, the owner may indicate that if an environmental change occurs a push notification should be transmitted to his/her mobile phone and the wearable device 114 (e.g., smart watch). Upon modifying or adding a condition/notification, the notification server 202 may update the notification preferences. For example, a database may be used that stores a policy entry for a property owner. Similar notification preferences may be stored for local authorities in a geographic region. Thus, if an environmental or infrastructure change is determined, the relevant authorities may be notified (e.g., police, fire, medical).

In various examples, the action module 220 examines the types of category of a change and where the change occurred to determine the notification(s) to transmit based on the notification preferences. This process may also include determination of what devices of a user to send the notification to. The action module 220 may then determine a UAV in proximity to a device that is to receive the notification. For example, the notification server 202 may store the current coordinates of UAVs as it receives the image data 204, sensor data 206, and vehicle data 208.

The action module 220 may then transmit instructions and the content of the notification to the UAV that is in proximity (e.g., the closest UAV within communication range of the device) to the device. The UAV may then transmit the notification to the device. A notification may be text-based such as a summary of the change, an audio alert, or an image alert such as a picture of the change. Because a UAV may be used to transmit the notification, the user may be able to receive the notification even if he/she is not in cell coverage. In an example, the notification server 202 transmits the notification without using a UAV as an intermediary.

In various examples, the notification server 202 also transmits notifications to devices based on the received sensor data 206 and the vehicle data 208. For example, consider the situation in which a user is traveling from work to home. A UAV may detect an irrigation leak in the user's home based on a sensor reading. The sensor reading may be transmitted to the notification server 202. The action module 220 may retrieve contact information for the user (e.g., devices for communication), determine the location of the user (e.g., by leveraging other drones to locate the user), and transmit a notification to a device of the user.

Figure 4:
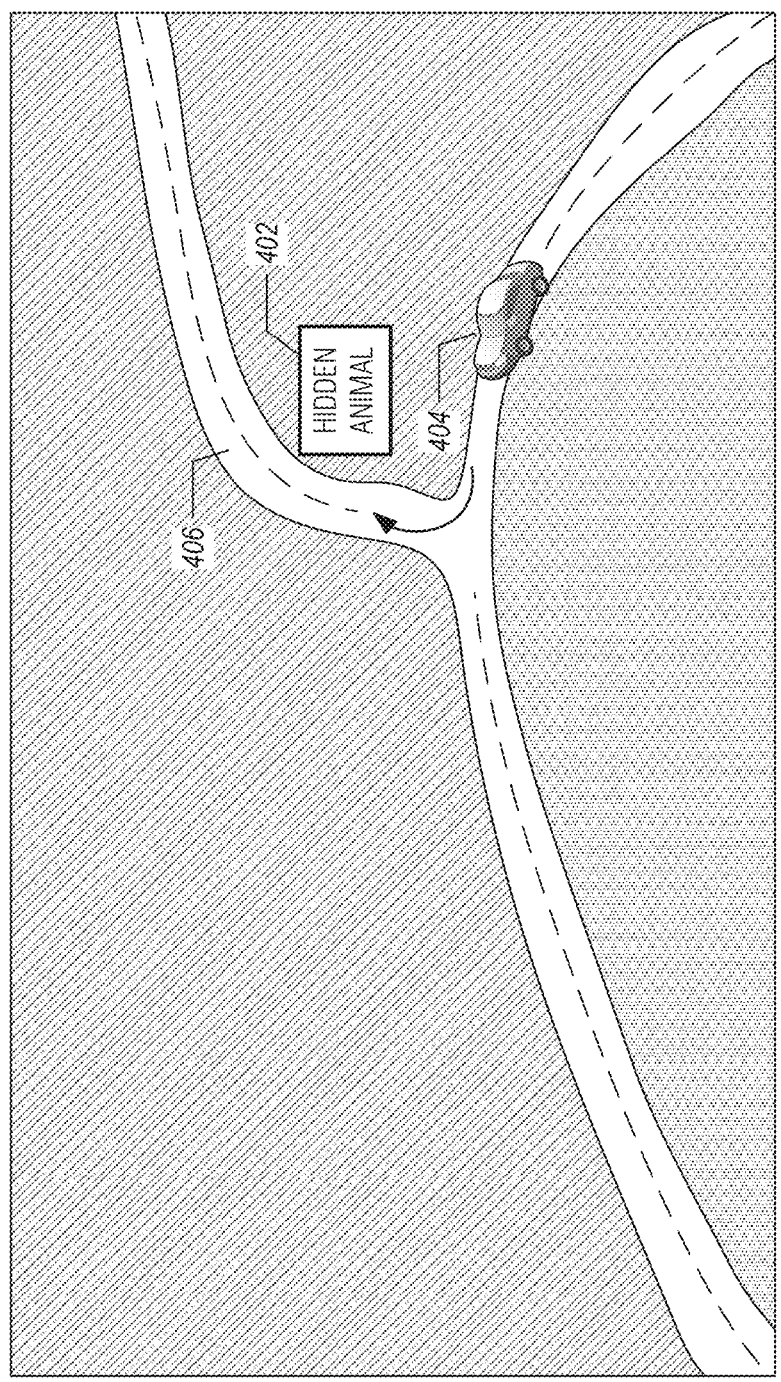
FIG. 4 illustrates image data of a traffic hazard, according to various examples.

FIG. 4 illustrates stylized image data of a traffic hazard, according to various examples. For example, consider that change detection module 218 detects a problem with a particular road, such as debris or nearby wildlife 402. The notification server 202 may transmit instructions to a UAV in the vicinity of the problem and have it broadcast information about the problem to vehicles within range of the UAV. The information may include a detour. Furthermore, the vehicle data 208 for a particular vehicle—the vehicle 404—may indicate that, while not currently in the problem area, the vehicle 404 is about to turn on to the road 406. Thus, another (or potentially the same) UAV may transmit a notification to the navigation system of the vehicle 404 to use an alternate route.

Figure 5:
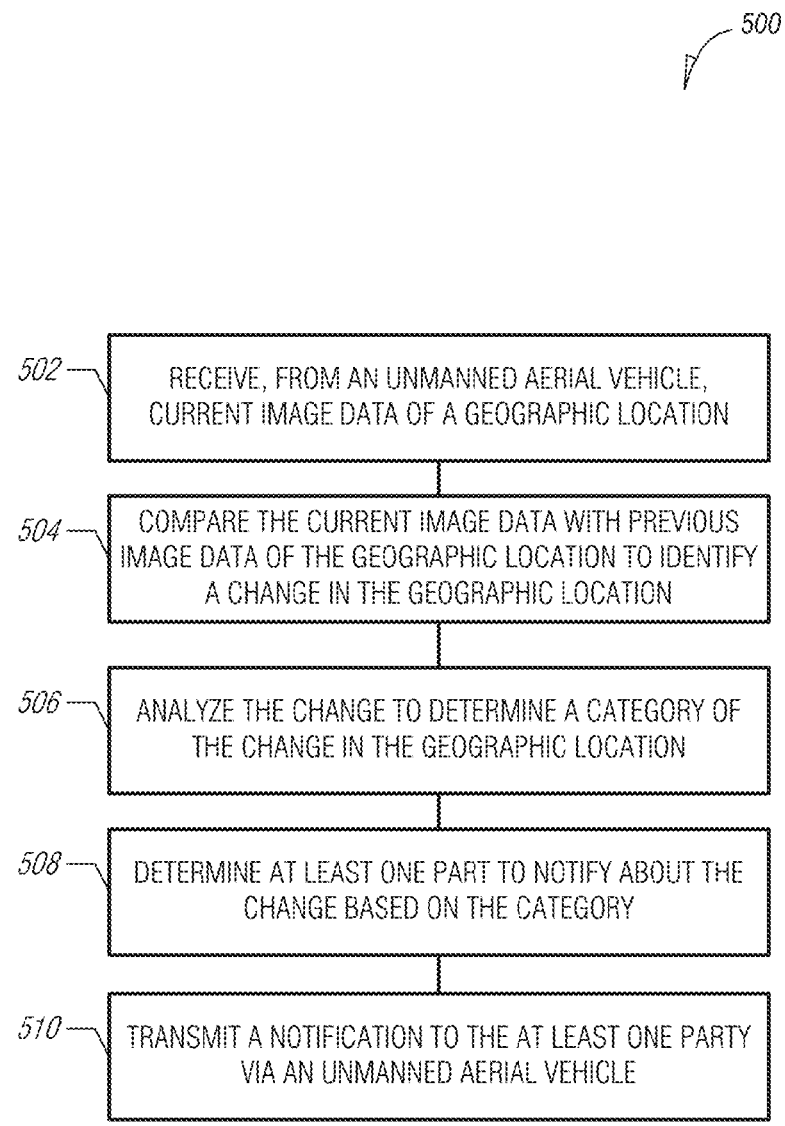
FIG. 5 is a flow chart illustrating methods to transmit notifications to a party, according to various examples.

Using geographic location and environmental change as an example, FIG. 5 is a flow chart illustrating a method 500 to transmit notifications to a party. The method 500 may be performed by any of the modules, logic, or components described herein. Other types of information and change detection may follow a similar flow chart.

In an example, at operation 502, current image data of a geographic location is received from an unmanned aerial vehicle (UAV). The current image data may be received at a server such as the notification server 202. In an example, the current image data is infrared image data. The current image data may be a subset of a current picture of the geographic location. For example, it may be the changes from the previous time the UAV captured a picture of the geographic location. The notification server 202 may also receive the GPS coordinates of the geographic location based on the center of the geographic location or multiple GPS coordinates of the metes and bounds of the location.

In an example, at operation 504, the current image data is compared with previous image data for the geographic location. For example, the change detection module 218 may utilize the received GPS coordinates to retrieve images data for the location. In an example, at least two previous images of the geographic location are retrieved from the datastore. The current image data may be transformed to match the perspective of the previous images data. Transformations may include rotations, scaling, altering brightness level, skewing the image etc. The change detection module 218 may compare the transformed current image data with the previous images and determine a percentage of the current image data that is different than the previous image data.

In an example, at operation 506, the change is analyzed and a category determined for the change. For example, computer vision and image analysis may be used to examine the changed portion of the current image—as identified by the change detection module 218—to match the changed portion of the image with existing categorized imagery. The change detection module 218 may also analyze the changed portion of the image to determine what is being changed. In other words, determine if the changed portion of the image a road, a house, a field, etc. For example, if the location in previous image data indicates a road and the current image data indicates a change to the road, the change may be categorized as a road hazard.

In an example, at operation 508, at least one party to notify about the change based on the category is determined. For example, the action module 220 may query a database of parties to determine a party that has requested notifications for the category of change. In various examples, not all parties that have requested notifications may be notified, but only the ones within the bounds of the geographic location. In an example, the location of the party is determined (e.g., by using UAVs to locate the party, using GPS coordinates of the parties phone, etc.).

In an example, at operation 510, an unmanned aerial vehicle transmits a notification to the at least one party. In an example, a database may be queried to retrieve location information of at least one UAV and the at least one party. The location of a party may be determined by querying one or more UAVs to determine if the UAVs are able to communicate with the at least party. The location may also be determined by requesting the information from an external service (e.g., a cell network). The location information of the at least one UAV may be compared with the location information of the at least one party to determine a UAV within a threshold distance of the at least one party. The threshold distance may be set by an administrator of the information brokerage service 102 using the input techniques described above for user notification preferences.

Upon determining the at least one UAV, instructions may be transmitted to the UAV to transmit the notification to the at least one party. In an example, a notification may be transmitted to a first responder when the category of the change indicates an accident present in the geographic location. In various examples, a database is queried to retrieve device information associated with the at least party. The device information may indicate the type of device to notify for the user. For example, the device information may indicate the at least one UAV is to notify the smart phone of the at least one party.

In various examples, various examples other data may be received to determine who/what to notify. For example, information about a vehicle's route may be received. The route may be analyzed to determine that the route includes a road hazard identified by the change detection module 218. A database may be queried to determine a party associated with the vehicle and a notification may be transmitted to the party. The notification may include an updated route for the vehicle around the road hazard. In an example, the notification is transmitted to a navigation system of the vehicle.

As discussed above, the system and method described herein may allow for imagery correlation with the other information from other sensors (e.g., sensor data 206). For example, sensors in road infrastructure may report that there is an accident or stalled traffic but the cameras from a drone may contradict this information. This disconnect may mean that the road sensors may have reported false data caused by malware or intentional manipulation of data by an adversary to cause traffic jam or to divert traffic to a different route.

In various examples, the drones may form a mesh network to send messages in areas with no connectivity. For example, where the drones may actively seek other drones or receiving stations to establish connections in case of an emergency.

Additionally, the image analysis may be used to predict problems before they occur. For example, cracks in a road could indicate a future landslide or an earthquake. Rather than notifying authorities after the event, the system may warn about changes. The system may also correlate similar changes to other places, such as in agriculture. For example, locust could be devastating to crops but imagery from the drones may detect signs before a major outbreak occurs. Likewise similar technique in correlation with social media may warn about health epidemics, like Ebola in Africa.

Example Computer System

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 6:
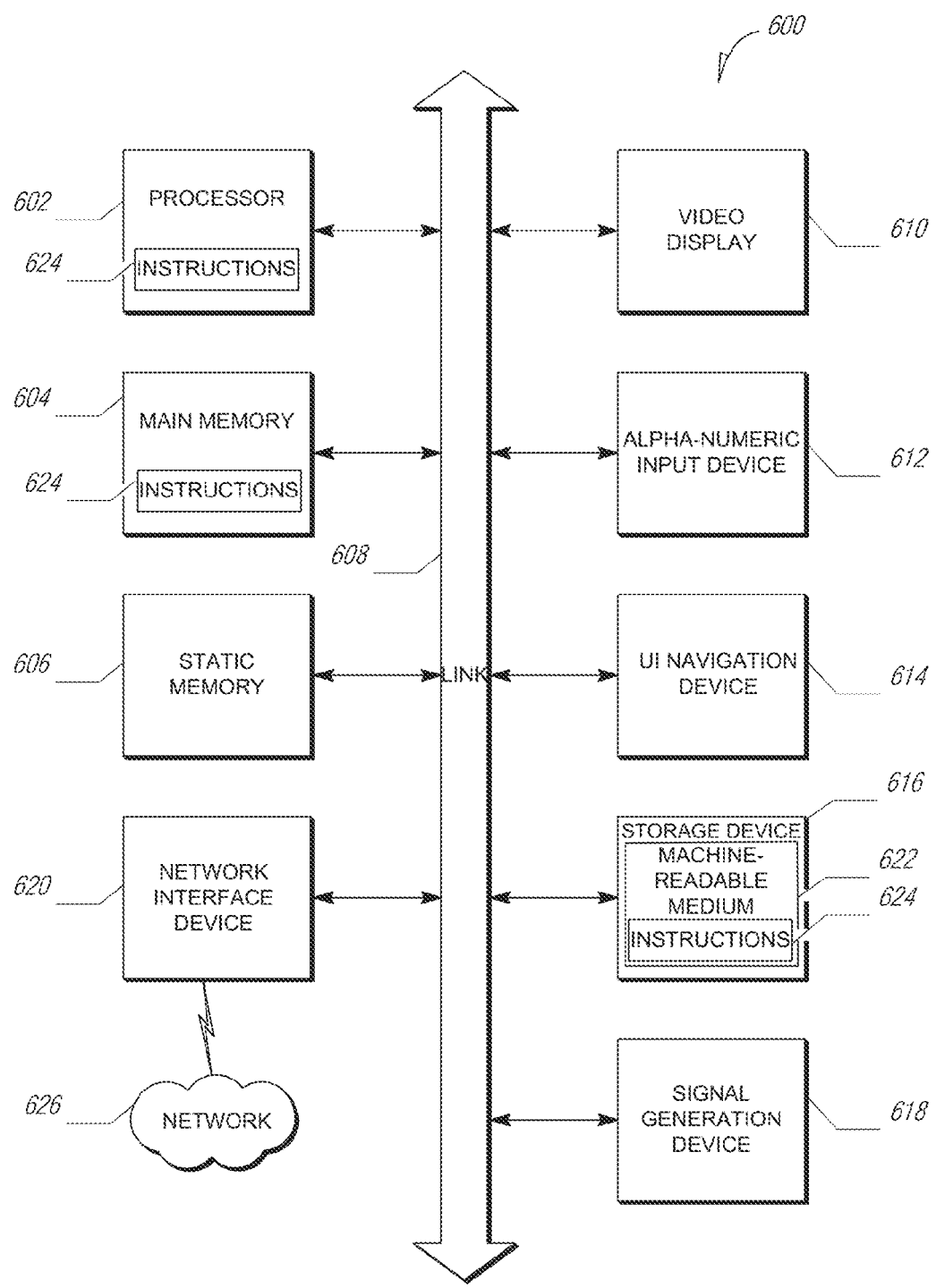
FIG. 6 is a block diagram of machine in the example form of a computer system within which a set instructions, for causing the machine to perform any one or more of the methodologies discussed herein, may be executed.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Example 1 includes subject matter (such as a device, apparatus, or machine) for transmitting notifications to at least one party based on image data analysis comprising: an image registration module to receive, from an unmanned aerial vehicle, current image data of a geographic location; a change detection module to: compare the current image data with previous image data of the geographic location to identify a change in the geographic location; and analyze the change to determine a category of the change in the geographic location; and an action module to: determine at least one party to notify about the change based on the category; and transmit a notification to the at least one party via an unmanned aerial vehicle.

In Example 2, the subject matter of Example 1 may include, wherein to analyze the change to determine the category of the change in the geographic location, the change detection module is to: detect the change is on a road in the geographic location; and categorize the change as a road hazard.

In Example 3, the subject matter of any one of Examples 1 to 2 may include, wherein the action module is to: receive information for a vehicle indicating a route of the vehicle; determine the route includes the road in the geographic region; and wherein to determine the at least one party to notify about the change a database is queried to determine a party associated with the vehicle.

In Example 4, the subject matter of any one of Examples 1 to 3 may include, to transmit the notification to the at least one party via the unmanned aerial vehicle, the action module is to: transmit the notification to the party associated with the vehicle, the notification including an updated route for the vehicle to avoid the change.

In Example 5, the subject matter of any one of Examples 1 to 4 may include, wherein to transmit the notification to the at least one party via the unmanned aerial vehicle, the action module is to: transmit the notification to a first responder when the category of the change indicates an accident present in the geographic location.

In Example 6, the subject matter of any one of Examples 1 to 5 may include, wherein the current image data of the geographic location includes infrared image data of the geographic location.

In Example 7, the subject matter of any one of Examples 1 to 6 may include, wherein to compare the current image data with the previous image data of the geographic location, the change detection module is to: transform the current image data into transformed image data to match a perspective of the previous image data; and calculate a percentage change between the transformed image data and the previous image data.

In Example 8, the subject matter of any one of Examples 1 to 7 may include, wherein the transformed image data is a rotated and scaled version of the current image data.

In Example 9, the subject matter of any one of Examples 1 to 8 may include, wherein to transmit the notification to the at least one party via the unmanned aerial vehicle, the action module is to: query a database to retrieve location information of at least one UAV and the at least one party; compare the location information of the at least one UAV with the location information of the at least one party to determine a UAV within a threshold distance of the at least one party; and transmit an instruction to the UAV within the threshold distance, the instruction to transmit the notification to the at least one party.

In Example 10, the subject matter of any one of Examples 1 to 9 may include, wherein to compare the current image data with the previous image data of the geographic location, the change detection module is to: access a datastore of previous image data for the geographic location; retrieve, from the datastore, at least two images of the geographic location taken at different times; and compare the at least two images of the geographic location with the current image data.

In Example 11, the subject matter of any one of Examples 1 to 10 may include, wherein to determine at least one party to notify about the change based on the category, the action module is to: query a database of parties to determine a party that has requested notifications for the category of change.

In Example 12, the subject matter of any one of Examples 1 to 11 may include, wherein to determine at least one party to notify about the change based on the category, the action module is to: determine the location of the party; and store an indication that the party is to be notified when the location of party is within the bounds of the geographic region.

In Example 13, the subject matter of any one of Examples 1 to 12 may include, a network interface to receive, via the unmanned aerial vehicle, sensor data from a wearable device.

In Example 14, the subject matter of any one of Examples 1 to 13 may include, network interface to receive, via the unmanned aerial vehicle, sensor data from a property.

Example 15 includes subject matter (such as a method, means for performing acts, machine readable medium including instructions that when performed by a machine cause the machine to performs acts, or an apparatus to perform) for transmitting notifications to at least one party based on image data analysis comprising: receiving, from an unmanned aerial vehicle, current image data of a geographic location; comparing the current image data with previous image data of the geographic location to identify a change in the geographic location; analyzing the change to determine a category of the change in the geographic location; determining at least one party to notify about the change based on the category; and transmitting a notification to the at least one party via an unmanned aerial vehicle.

In Example 16, the subject matter of Example 15 may include, wherein analyzing the change to determine the category of the change in the geographic location comprises: detecting the change is on a road in the geographic location; and categorizing the change as a road hazard.

In Example 17, the subject matter of any one of Examples 15 to 16 may include, receiving information for a vehicle indicating a route of the vehicle; determining the route includes the road in the geographic region; and wherein determining the at least one party to notify about the change based on the category includes querying a database to determine a party associated with the vehicle.

In Example 18, the subject matter of any one of Examples 15 to 17 may include, wherein transmitting the notification to the at least one party via the unmanned aerial vehicle comprises: transmitting the notification to the party associated with the vehicle, the notification including an updated route for the vehicle to avoid the change.

In Example 19, the subject matter of any one of Examples 15 to 18 may include, wherein transmitting the notification to the at least one party comprises: transmitting the notification to a first responder when the category of the change indicates an accident present in the geographic location.

In Example 20, the subject matter of any one of Examples 15 to 19 may include, wherein receiving current image data of the geographic location include receiving infrared image data of the geographic location.

In Example 21, the subject matter of any one of Examples 15 to 20 may include, wherein comparing the current image data with the previous image data of the geographic location comprises: transforming the current image data into transformed image data to match a perspective of the previous image data; and calculating a percentage change between the transformed image data and the previous image data.

In Example 22, the subject matter of any one of Examples 15 to 21 may include, wherein transforming the current image data into transformed image data comprises rotating and scaling the current image data.

In Example 23, the subject matter of any one of Examples 15 to 22 may include, wherein transmitting the notification to the at least one party via the unmanned aerial vehicle comprises: querying a database to retrieve location information of at least one UAV and the at least one party; comparing the location information of the at least one UAV with the location information of the at least one party to determine a UAV within a threshold distance of the at least one party; and transmitting an instruction to the UAV within the threshold distance, the instruction to transmit the notification to the at least one party.

In Example 24, the subject matter of any one of Examples 15 to 23 may include, wherein comparing the current image data with previous image data of the geographic location comprises: accessing a datastore of previous image data for the geographic location; retrieving, from the datastore, at least two images of the geographic location taken at different times; and comparing the at least two images of the geographic location with the current image data.

In Example 25, the subject matter of any one of Examples 15 to 24 may include, wherein determining at least one party to notify about the change based on the category comprises: querying a database of parties to determine a party that has requested notifications for the category of change.

In Example 26, the subject matter of any one of Examples 15 to 25 may include, wherein determining the at least one party to notify about the change based on the category further comprises: determining the location of the party; and storing an indication that the party is to be notified when the location of party is within the bounds of the geographic region.

In Example 27, the subject matter of any one of Examples 15 to 26 may include, receiving, via the unmanned aerial vehicle, sensor data from a wearable device.

In Example 28, the subject matter of any one of Examples 15 to 27 may include, receiving, via the unmanned aerial vehicle, sensor data from a property.

Example 29 includes at least one machine-readable medium including instructions, which when executed by a machine, cause the machine to perform operations of any of the Examples 15-28.

Example 30 includes an apparatus comprising means for performing any of the Examples 15-28.

Example 31 includes subject matter (such as a device, apparatus, or machine) for transmitting notifications to at least one party based on image data analysis comprising: means for receiving, from an unmanned aerial vehicle, current image data of a geographic location; means for comparing the current image data with previous image data of the geographic location to identify a change in the geographic location; means for analyzing the change to determine a category of the change in the geographic location; means for determining at least one party to notify about the change based on the category; and means for transmitting a notification to the at least one party via an unmanned aerial vehicle.

In Example 32, the subject matter of Example 31 may include, wherein the means for analyzing the change to determine the category of the change in the geographic location comprise: means for detecting the change is on a road in the geographic location; and means for categorizing the change as a road hazard.

In Example 33, the subject matter of any one of Examples 31 to 32 may include, means for receiving information for a vehicle indicating a route of the vehicle; means for determining the route includes the road in the geographic region; and wherein the means for determining the at least one party to notify about the change based on the category include means for querying a database to determine a party associated with the vehicle.

In Example 34, the subject matter of any one of Examples 31 to 33 may include, wherein the means for transmitting the notification to the at least one party via the unmanned aerial vehicle comprise: means for transmitting the notification to the party associated with the vehicle, the notification including an updated route for the vehicle to avoid the change.

In Example 35, the subject matter of any one of Examples 31 to 34 may include, wherein the means for transmitting the notification to the at least one party comprise: means for transmitting the notification to a first responder when the category of the change indicates an accident present in the geographic location.

In Example 36, the subject matter of any one of Examples 31 to 35 may include, wherein the means for receiving current image data of the geographic location include means for receiving infrared image data of the geographic location.

In Example 37, the subject matter of any one of Examples 31 to 36 may include, wherein the means for comparing the current image data with the previous image data of the geographic location comprise: means for transforming the current image data into transformed image data to match a perspective of the previous image data; and means for calculating a percentage change between the transformed image data and the previous image data.

In Example 38, the subject matter of any one of Examples 31 to 37 may include, wherein the means for transforming the current image data into transformed image data comprise means for rotating and scaling the current image data.

In Example 39, the subject matter of any one of Examples 31 to 38 may include, wherein the means for transmitting the notification to the at least one party via the unmanned aerial vehicle comprise: means for querying a database to retrieve location information of at least one UAV and the at least one party; means for comparing the location information of the at least one UAV with the location information of the at least one party to determine a UAV within a threshold distance of the at least one party; and means for transmitting an instruction to the UAV within the threshold distance, the instruction to transmit the notification to the at least one party.

In Example 40, the subject matter of any one of Examples 31 to 39 may include, wherein the means for comparing the current image data with previous image data of the geographic location comprise: means for accessing a datastore of previous image data for the geographic location; means for retrieving, from the datastore, at least two images of the geographic location taken at different times; and means for comparing the at least two images of the geographic location with the current image data.

In Example 41, the subject matter of any one of Examples 31 to 40 may include, wherein the means for determining at least one party to notify about the change based on the category comprise: means for querying a database of parties to determine a party that has requested notifications for the category of change.

In Example 42, the subject matter of any one of Examples 31 to 41 may include, wherein the means for determining the at least one party to notify about the change based on the category further comprise: means for determining the location of the party; and means for storing an indication that the party is to be notified when the location of party is within the bounds of the geographic region.

In Example 43, the subject matter of any one of Examples 31 to 42 may include, means for receiving, via the unmanned aerial vehicle, sensor data from a wearable device.

In Example 44, the subject matter of any one of Examples 31 to 43 may include, means for receiving, via the unmanned aerial vehicle, sensor data from a property.

What is claimed is:

1. A system for transmitting notifications to a party based on image data analysis, the system comprising:
   at least one processor;
   a storage device comprising instructions, which when executed by the at least one processor, configure the at least one processor to:
   receive, from an unmanned aerial vehicle, current image data of a geographic location;
   compare the current image data with previous image data of the geographic location to identify a change in the geographic location;
   analyze the change to determine a category of the change in the geographic location;
   query a database to determine a device, selected from multiple devices associated with the party to notify about the change based on the geographic location, the category, and notifications preferences, the notification preferences established by the party; and
   transmit a notification to the device of the party via an unmanned aerial vehicle.

2. The system of claim 1, wherein to analyze the change to determine the category of the change in the geographic location, the at least one processor is configured to:
   detect the change is on a road in the geographic location; and
   categorize the change as a road hazard.

3. The system of claim 2, wherein the at least one processor is further configured, while executing the instructions, to:
   receive information for a vehicle indicating a route of the vehicle;
   determine the route includes the road in the geographic region; and
   wherein the database is queried to determine a party associated with the vehicle.

4. The system of claim 3, wherein the notification includes an updated route for the vehicle to avoid the road hazard.

5. The system of claim 1, wherein to transmit the notification to the device of the party via the unmanned aerial vehicle, the at least one processor is configured to:
   transmit the notification to a device of a first responder when the category of the change indicates an accident present in the geographic location.

6. The system of claim 1, wherein the current image data of the geographic location includes infrared image data of the geographic location.

7. The system of claim 1, wherein to compare the current image data with the previous image data of the geographic location, the at least one processor is configured to: transform the current image data into transformed image data to match a perspective of the previous image data; and
   calculate a percentage change between the transformed image data and the previous image data.

8. Then system of claim 7, wherein the transformed image data is a rotated and scaled version of the current image data.

9. The system of claim 1, wherein to transmit the notification to the at least one device via the unmanned aerial vehicle, the at least one processor is configured to:
   query a database to retrieve location information of at least one UAV and the party;
   compare the location information of the at least one UAV with the location information of the party to determine a UAV within a threshold distance of the party; and
   transmit an instruction to the UAV within the threshold distance, the instruction to transmit the notification to the device.

10. The system of claim 1, wherein to compare the current image data with the previous image data of the geographic location, the at least one processor is configured to:
    access a datastore of previous image data for the geographic location;
    retrieve, from the datastore, at least two images of the geographic location taken at different times; and
    compare the at least two images of the geographic location with the current image data.

11. A method for transmitting notifications to a party based on image data analysis, the method comprising:
    receiving, from an unmanned aerial vehicle, current image data of a geographic location;
    comparing the current image data with previous image data of the geographic location to identify a change in the geographic location;
    analyzing the change to determine a category of the change in the geographic location;
    querying a database to determine a device, selected from multiple devices associated with the party to notify about the change based on the geographic location, the category, and notifications preferences, the notification preferences established by the party; and transmitting a notification to the device of the party via an unmanned aerial vehicle.

12. The method of claim 11, wherein analyzing the change to determine the category of the change in the geographic location comprises:
  detecting the change is on a road in the geographic location; and
  categorizing the change as a road hazard.

13. The method of claim 12, further comprising:
  receiving information for a vehicle indicating a route of the vehicle;
  determining the route includes the road in the geographic region; and
  wherein the database is queried to determine a party associated with the vehicle.

14. The method of claim 13, wherein the notification includes an updated route for the vehicle to avoid the change.

15. The method of claim 11, wherein transmitting the notification to the device of the party comprises:
  transmitting the notification to a device of a first responder when the category of the change indicates an accident present in the geographic location.

16. The method of claim 11, wherein receiving current image data of the geographic location include receiving infrared image data of the geographic location.

17. The method of claim 11, wherein comparing the current image data with the previous image data of the geographic location comprises:
  transforming the current image data into transformed image data to match a perspective of the previous image data; and
  calculating a percentage change between the transformed image data and the previous image data.

18. Then method of claim 17, wherein transforming the current image data into transformed image data comprises rotating and scaling the current image data.

19. The method of claim 11, wherein transmitting the notification to the device of the party via the unmanned aerial vehicle comprises:
  querying a database to retrieve location information of at least one UAV and the party;
  comparing the location information of the at least one UAV with the location information of the party to determine a UAV within a threshold distance of the party; and
  transmitting an instruction to the UAV within the threshold distance, the instruction to transmit the notification to device of the party.

20. The method of claim 11, wherein comparing the current image data with previous image data of the geographic location comprises:
  accessing a datastore of previous image data for the geographic location;
  retrieving, from the datastore, at least two images of the geographic location taken at different times; and
  comparing the at least two images of the geographic location with the current image data.

21. At least one non-transitory machine-readable medium including instructions, which when executed by a machine, cause the machine to perform operations comprising:
  receiving, from an unmanned aerial vehicle, current image data of a geographic location;
  comparing the current image data with previous image data of the geographic location to identify a change in the geographic location;
  analyzing the change to determine a category of the change in the geographic location;
  querying a database to determine a device, selected from multiple devices associated with the party to notify about the change based on the geographic location, the category, and notifications preferences, the notification preferences established by the party; and
  transmitting a notification to the device of the party via an unmanned aerial vehicle.

22. The at least one machine-readable medium of claim 21, wherein the operation of analyzing the change to determine the category of the change in the geographic location comprises:
  detecting the change is on a road in the geographic location; and
  categorizing the change as a road hazard.

23. The at least one machine-readable medium of claim 22, the operations further comprising:
  receiving information for a vehicle indicating a route of the vehicle;
  determining the route includes the road in the geographic region; and
  wherein the database is queried to determine a party associated with the vehicle.

24. The at least one machine-readable medium of claim 23, wherein the notification includes an updated route for the vehicle to avoid the change.

25. The at least one machine-readable medium of claim 21, wherein the operation of transmitting the notification to the device of the party comprises:
  transmitting the notification to a device of a first responder when the category of the change indicates an accident present in the geographic location.

* * * * *

UNITED STATES PATENT AND TRADEMARK OFFICE
CERTIFICATE OF CORRECTION

PATENT NO. : 9,858,478 B2  
APPLICATION NO. : 14/577965  
DATED : January 2, 2018  
INVENTOR(S) : Tatourian et al.

Page 1 of 1

It is certified that error appears in the above-identified patent and that said Letters Patent is hereby corrected as shown below:

In the Claims

In Column 15, Line 59, in Claim 1, delete "party" and insert --party,-- therefor In Column 15, Line 61, in Claim 1, delete "notifications" and insert --notification-- therefor In Column 16, Line 27, in Claim 7, after "configured to:", insert --¶--

In Column 16, Line 64, in Claim 11, delete "party" and insert --party,-- therefor In Column 16, Line 66, in Claim 11, delete "notifications" and insert --notification-- therefor In Column 17, Line 50, in Claim 19, after "to", insert --the--

In Column 18, Line 20, in Claim 21, delete "party" and insert --party,-- therefor In Column 18, Line 22, in Claim 21, delete "notifications" and insert --notification-- therefor In Column 18, Line 26, in Claim 22, after "one", insert --non-transitory--

In Column 18, Line 33, in Claim 23, after "one", insert --non-transitory--

In Column 18, Line 41, in Claim 24, after "one", insert --non-transitory--

In Column 18, Line 44, in Claim 25, after "one", insert --non-transitory--

Signed and Sealed this  
Fourth Day of June, 2019

Andrei Iancu  
*Director of the United States Patent and Trademark Office*